US 6,545,418 B1

(12) United States Patent
Kolpasky et al.

(10) Patent No.: US 6,545,418 B1
(45) Date of Patent: Apr. 8, 2003

(54) ILLUMINATING SPEAKER ASSEMBLY

(75) Inventors: Kevin G. Kolpasky, Sterling Heights, MI (US); Christopher E. Borroni-Bird, Oakland Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/956,357

(22) Filed: Sep. 20, 2001

(51) Int. Cl.[7] .................................................. B60Q 3/00
(52) U.S. Cl. ............................ 315/77; 315/80; 362/86; 381/86
(58) Field of Search ........................... 315/80, 81, 84, 315/76, 77; 362/86, 26, 27, 31, 234; 381/86, 302

(56) References Cited

U.S. PATENT DOCUMENTS

| | | | | |
|---|---|---|---|---|
| 4,875,143 A | * | 10/1989 | Fernandez | 362/86 |
| 4,953,220 A | * | 8/1990 | Murayama et al. | 381/86 |
| 6,000,493 A | * | 12/1999 | Chen | 362/86 |
| 6,016,038 A | | 1/2000 | Mueller et al. | 315/291 |
| 6,150,774 A | | 11/2000 | Mueller et al. | 315/291 |
| 6,158,869 A | * | 12/2000 | Barnes, Jr. | 362/86 |
| 6,278,787 B1 | * | 8/2001 | Azima | 381/152 |

OTHER PUBLICATIONS

Azima, "NXT—A Technical Overview," website: www.nxt-sound.com/www/technology/white_paper/technical_1.htm (2000).

* cited by examiner

*Primary Examiner*—Don Wong
*Assistant Examiner*—Ephrem Alemu
(74) *Attorney, Agent, or Firm*—Christopher DeVries

(57) ABSTRACT

An illuminating speaker assembly for use in the passenger compartment of a vehicle includes a flat panel speaker for converting electrical audio signals into sound waves. The flat panel speaker utilizes a light-permeable, sound-producing panel. A light source is positioned within the flat panel speaker for generating light that passes through the light-permeable, sound-producing panel.

20 Claims, 3 Drawing Sheets

ILLUMINATING SPEAKER ASSEMBLY

TECHNICAL FIELD

This invention relates generally to audio/illumination systems, and more particularly to an illuminating speaker assembly for use in the passenger compartment of a vehicle.

BACKGROUND OF THE INVENTION

It is well known that automotive vehicles are commonly equipped with audio entertainment systems. In some cases, the audio system is simple in nature comprising, for example, an AM/FM radio and one or more speakers. However, late model vehicles including automobiles, SUVs, pickup trucks, and the like, more often than not are equipped with complex and elaborate audio entertainment systems which include, for example, an AM/FM radio, cassette tape player, compact disk player, and a plurality of loudspeakers mounted throughout the vehicle's passenger compartment in, for example, the dashboard, the headliner, the vehicle's doors, the vehicle's rear deck, etc.

In the past, such speaker systems utilized conventional loudspeakers of the type wherein pistonic motion of a diaphragm (i.e., a generally conical diaphragm moves as a rigid whole) is achieved by some method of transduction, e.g., electromagnetic, electrostatic, piezoelectric, etc. Such speakers are sometimes bulky, thus requiring that additional space be provided to accommodate their placement. In the case of door-mounted speakers, this could result in the necessity for doors thicker than would otherwise be required. Furthermore, the mounting of such speakers in the rear deck could result in a reduction of available trunk space. Finally, not only do traditional loudspeakers display variation in directivity with frequency, but also their sound performance is further degraded as a result of mounting them in undesirable locations such as the doors of a vehicle's passenger compartment.

In the early 1990s, it was discovered that panels acted as efficient sound radiators. This discovery found application in loudspeakers, which are now referred to as flat panel, distributed-mode loudspeakers (DML). The diaphragm or panel of a DML vibrates in a complex pattern over its entire surface. Close to the diaphragm, the sound field created by this complex pattern of vibration is likewise complex; however, at a short distance away, it takes on the far-field characteristics of DML radiation which closely approximates the directivity of a true point source, i.e., approaching omni directional. New Tranducers Ltd., now known simply as NXT, was a leader in developing distributed-mode loudspeakers.

It is also well known that vehicular passenger compartments are provided with interior illumination systems which may be manually turned on by a passenger when needed or which are automatically energized under certain conditions, for example, when one of the vehicle's passenger compartment doors is opened in a low ambient light environment. In this manner, a driver/passenger is provided sufficient light at night to enter a vehicle, get settled, and start the vehicle. Exemplary is the traditional dome light commonly mounted in an upper region of the passenger compartment's interior headliner. Such lights may also be positioned throughout the passenger compartment such as in other regions of the headliner, doors, sun visors, seats, etc.

While generally adequate for its intended purpose, the traditional dome light is simply a light. No means are generally provided for altering its color and intensity in order to create a desired atmosphere or ambiance. In addition, the need to provide interior lighting within the vehicle's passenger compartment presents automotive designers with a problem similar to one associated with providing interior speakers. That is, both interior speakers and interior lighting fixtures consume space, which in turn contributes to the overall size and weight of the vehicle.

In view of the foregoing, it should be appreciated that it would be desirable to provide an illuminating speaker assembly which eliminates the need for separate speaker and lighting fixtures within a vehicle's passenger compartment while at the same time improving and enhancing audio and lighting performance. Additional desirable features will become apparent to one skilled in the art from the foregoing background of the invention taken in conjunction with the following detailed description of a preferred exemplary embodiment and the appended claims.

SUMMARY OF THE INVENTION

In accordance with the teachings of the present invention, there is provided an illuminating speaker assembly for use in the passenger compartment of a vehicle which includes a flat panel speaker for converting electrical audio signals into sound waves. The flat panel speaker utilizes a light-permeable, sound-producing panel. A light source is positioned within the flat panel speaker for generating light, which passes through the light-permeable, sound-producing panel.

BRIEF DESCRIPTION OF THE DRAWINGS

The present invention will hereinafter be described- in conjunction with the accompanying drawings, wherein like reference numerals denote like elements, and wherein.

DESCRIPTION OF THE PREFERRED EMBODIMENT

The following detailed description of a preferred exemplary embodiment of the invention is exemplary in nature and is not intended to limit the invention or its application or use.

Figure 1:
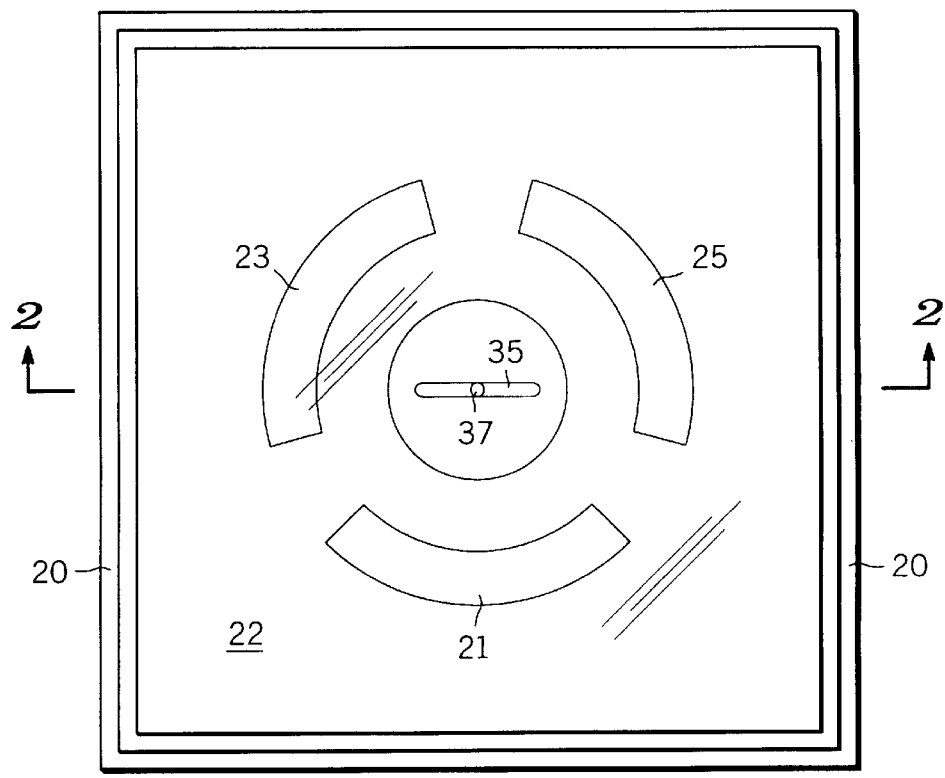
FIG. 1 is a bottom view of an illuminating speaker assembly in accordance with a preferred exemplary embodiment of the present invention.
Figure 2:
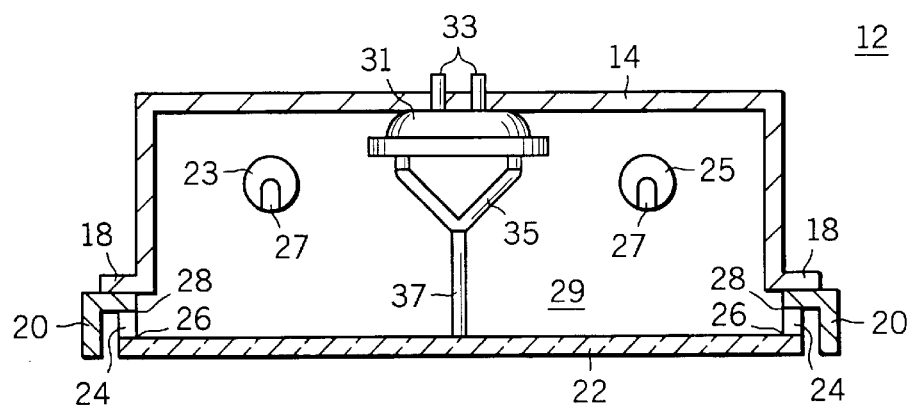
FIG. 2 is a sectional view of the illuminating speaker assembly shown in FIG. 1 taken along line A—A.

Referring to FIG. 1 and FIG. 2, there is shown an illuminating speaker assembly 12 in accordance with the teachings of the present invention. The illuminating speaker assembly includes a housing 14 which may be manufactured from any material that provides the necessary rigidity, e.g., metal, plastic, etc. Housing 14 is provided with an integral flange 18 around its periphery to which is coupled a mounting frame 20 manufactured from metal, plastic or any other material which provides appropriate support.

A light-permeable, flexible panel 22 (manufactured from, for example, acrylic, foam, or the like) is coupled to mounting frame 20 as, for example, by a cushioning coupler 24 which extends around the periphery of panel 22 and is attached thereto at 26. Coupler 24 may be made of any material suitable for such purpose such as foam, rubber, plastic, etc. An opposite region of coupler 24 is similarly attached to mounting frame 20 at 28. Thus, the structural cooperation of housing 14, flexible panel 22, mounting frame 20, and coupler 24 form the enclosure 29 of a flat panel, distributed-mode loudspeaker. Positioned within enclosure 29 is an LED lighting system represented by light-permeable tubes 21, 23, and 25, each of which contains a plurality of LEDs 27. This lighting system is more fully described hereinbelow in connection with FIG. 3.

To complete the flat panel, distributed mode loudspeaker, an exciter assembly 31 having input terminals 33 is coupled to panel 22 by means of conic coupler 35 and drive rod 37. While a variety of exciter technologies are available for energizing panel 22, including piezoelectric transducers, a moving coil motor exciter is preferred. Flat panel, distributed panel loudspeakers are available from New Transducers Ltd, now known simply as NXT.

Figure 3:
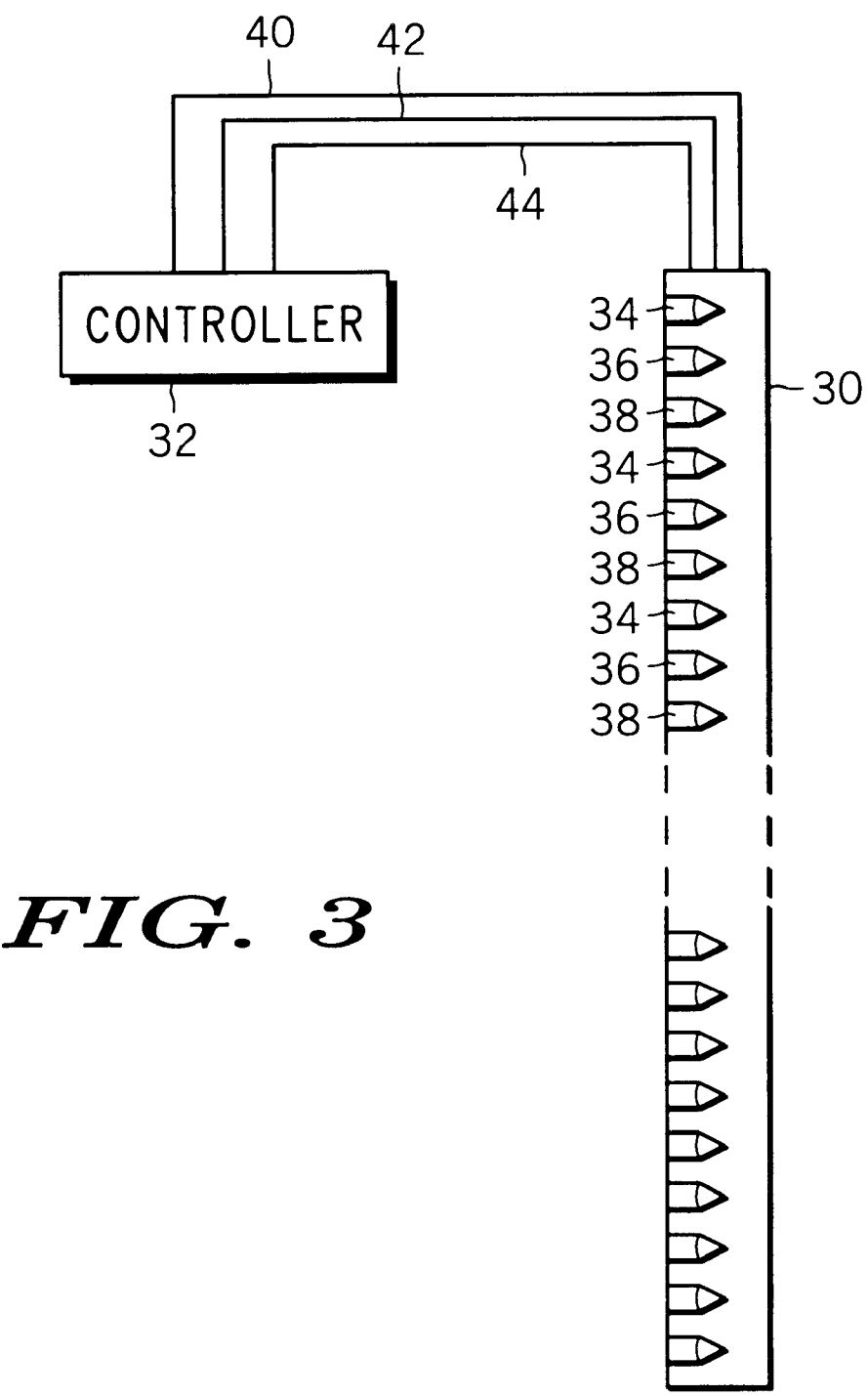
FIG. 3 is a functional block diagram of an exemplary illuminating apparatus for use in the inventive illuminating speaker assembly shown in FIG. 1 and FIG. 2.

Referring now to FIG. 3, there is shown a simple block diagram representative of a Light-Emitting-Diode (LED) lighting system. It is well known that combining the light of one color with the light of another color will result in the creation of a third color. It is also well known that the primary colors—red, blue, and green—can be combined in different proportions to create many colors in the visible spectrum. To that end, FIG. 3 comprises an LED tube 30 that is electrically coupled to controller 32. Tube 30 contains a plurality of red, blue, and green diodes positioned in a repeating pattern. That is, LEDs 34 are red, LEDs 36 are blue, and LEDs 38 are green. Tube 30 may contain, for example, thirty LEDs, ten of each color. The red LEDs 34 are activated to emit red light when an appropriate signal appears on output line 40 of controller 32. In a similar fashion, blue LEDs 36 are energized over line 42, and green LEDs 38 are energized over line 44.

As already alluded to, controller 32 generates electrical signals over output lines 40, 42, and 44, which in turn control the intensity of light generated by the red, blue, and green LED groups, respectively. Controller 32 could simply include three potentiometers, each one for controlling the voltage on lines 40, 42, and 44 and thus the intensity of the red, blue, and green light components to produce a desired composite color. By varying the voltages on lines 40, 42, and 44, the composite color emanating from tube 30 can be altered. Of course, three individual potentiometers could be incorporated into a single control device such as a track ball or joystick so as to permit the resultant color generated by LED tube 30 to be altered with a single adjustment. Finally, controller 32 may include a microprocessor thus resulting in a high-performance, computer-controlled, multicolored LED lighting system.

Multicolored LED lighting systems of the type shown and described in conjunction with FIG. 3 are known. One such system is shown and described in U.S. Pat. No. 6,016,038 entitled "Multicolored LED Lighting Method and Apparatus" issued Jan. 18, 2000 and assigned to Color Kinetics, Inc., the teachings of which are hereby incorporated by reference.

Figure 4:
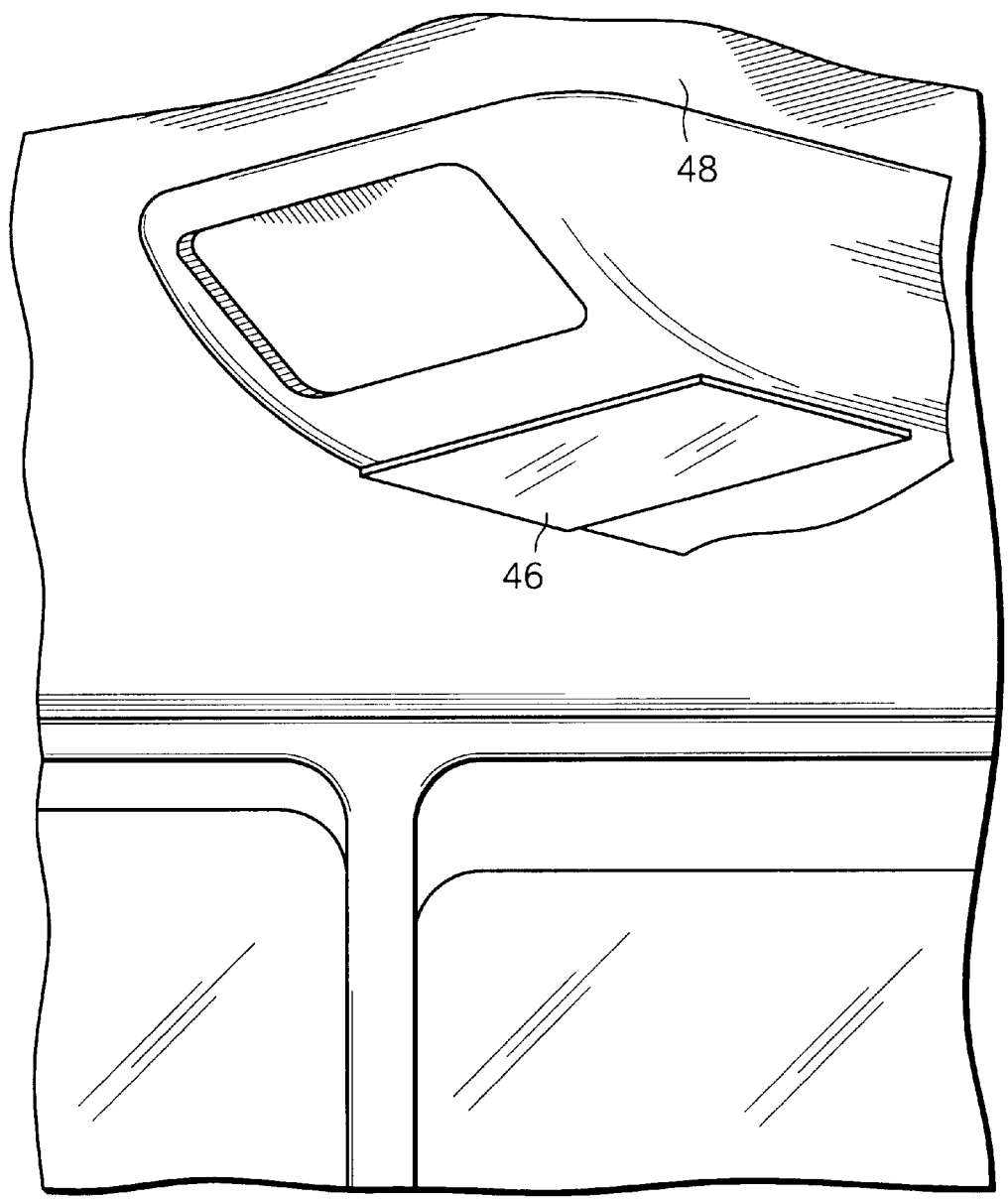
FIG. 4 is a graphical representation of the inventive illuminating speaker assembly shown in FIG. 1 and FIG. 2 deployed as a dome light in a conventional motor vehicle.

The resulting illuminating speaker assembly is particularly suitable for use within the passenger compartment of a motor vehicle as a replacement for the traditional audio speakers and dome light as is shown in FIG. 4. As can be seen, an illuminating speaker assembly 46 is mounted in an upper portion or headliner region 48 of a motor vehicle's passenger compartment. While only a single illuminating speaker is shown, it should be clear that a plurality of illuminating speakers may be deployed as, for example, in the four corner regions of the headliner or in other places where audio speakers or interior lights are traditionally deployed.

From the foregoing description, it should be appreciated that there has been provided an illuminating speaker assembly which can replace the traditional automotive dome light and audio speakers. One or more of the illuminating speakers may be mounted within the passenger compartment at convenient locations; for example, in the headliner. Each speaker assembly includes a light-permeable panel that is backlit with groups of red, blue, and green LEDs. The intensity of each group may be manually or automatically controlled to vary the color of the resultant or composite light passing through the light-permeable panel into the passenger compartment; i.e., the user will be able to customize the color of the light to produce a desired effect. The light intensity may be modulated with the same audio signals which drive the speaker to produce a light pattern that follows the beat of the music.

While a preferred exemplary embodiment has been shown and described, it should be appreciated that a vast number of variations exist. For example, the shape of the illuminating speaker may be modified so as to be accommodated at its location of deployment. Additionally, while the preferred exemplary embodiment has been described as utilizing three LED tubes containing red, blue and green LEDs, it should be appreciated that any light source may be employed (e.g., LEDs of only two colors or even monochromatic light) without departing from the scope of the invention.

Thus, the above description is given by way of example only. One skilled in the art may make changes in form and details without departing from the spirit and scope of the invention as set forth in the appended claims.

What is claimed is:

1. An illuminating speaker assembly for use in the passenger compartment of a vehicle, comprising:
   a flat panel speaker including a light-permeable, sound-producing panel, for converting electrical audio signals into sound waves; and
   a light source positioned within said flat panel speaker for generating light that passes through said light-permeable, sound-producing panel.

2. An illuminating speaker assembly according to claim 1 further comprising a controller for controlling the intensity of said light source.

3. An illuminating speaker assembly according to claim 1 wherein said light source comprises a plurality of light-emitting diodes.

4. An illuminating speaker assembly according to claim 3 wherein said plurality of said light-emitting diodes includes at least first and second groups, said first group for emitting light of a first color and said second group for emitting light of a second color.

5. An illuminating speaker assembly according to claim 4 wherein said plurality of light-emitting diodes further includes a third group of light-emitting diodes for emitting light of a third color.

6. An illuminating speaker assembly according to claim 5 wherein said first, second, and third colors are red, blue, and green, respectively.

7. An illuminating speaker assembly according to claim 5 further comprising a controller for individually varying the intensity of said first, second and third groups of light-emitting diodes to produce resultant light of a desired color.

8. An illuminating speaker assembly according to claim 7 wherein said controller comprises first, second, and third switches for varying the intensity of said first, second, and third groups of light-emitting diodes, respectively.

9. An illuminating speaker assembly according to claim 7 wherein said controller is a microprocessor.

10. An illuminating speaker assembly according to claim 3 wherein said plurality of light-emitting diodes is housed in at least one light-permeable tube.

11. An illuminating speaker assembly for use in the passenger compartment of a vehicle, comprising:
 a flat panel speaker including a light-permeable, sound-producing panel, for converting electrical signals into sound waves;
 a variable color light source positioned within said flat panel speaker for generating light which passes through said light-permeable, sound-producing panel; and
 a controller coupled to said color variable light source for altering the color of light generated by said variable color light source.

12. An illuminating speaker assembly according to claim 11 wherein said variable color light source comprises:
 a first plurality of light-emitting diodes for emitting light of a first color; and
 a second plurality of light-emitting diodes for emitting light of a second color.

13. An illuminating speaker assembly according to claim 12 wherein said variable color light source further comprises a third plurality of light-emitting diodes for emitting light of a third color.

14. An illuminating speaker assembly according to claim 13 wherein said first, second, and third colors are red, blue, and green, respectively.

15. An illuminating speaker assembly according to claim 13 wherein said controller individually varies the intensity of said first, second, and third groups of light-emitting diodes to produce resultant light of a desired color.

16. An illuminating speaker assembly according to claim 13 wherein said first, second, and third plurality of light-emitting diodes are housed in at least one light-permeable tube.

17. An illuminating speaker assembly according to claim 16 wherein said first, second, and third plurality of light-emitting diodes are housed in a plurality of light-permeable tubes.

18. A light-generating speaker assembly for use in the passenger compartment of a vehicle of the type which includes a source of potential, a source of audio electrical signals and a passenger compartment, comprising:
 a flat panel speaker assembly, comprising:
  a housing having a major opening therein mounted within the passenger compartment;
  a light-permeable, sound-producing panel coupled to said housing and across said major opening for producing sound waves; and
  a transducer mounted within said housing and having an input electrically coupled to the source of audio electrical signals and mechanically coupled to said light-permeable, sound-producing panel, for converting the audio electrical signals into acoustic energy and causing said light-permeable, sound-producing panel to vibrate;
 a controller positioned within said passenger compartment and coupled to said plurality of light-emitting diodes for selectively energizing said plurality of light-emitting diodes to alter the color of light passing through said light-permeable, sound-producing panel.

19. A light-generating speaker assembly according to claim 18 wherein said plurality of light-emitting diodes include a first group for generating red light, a second group for generating green light, and a third group for generating blue light.

20. A light-generating speaker assembly according to claim 19 wherein said plurality of light-emitting diodes is housed in at least one light-permeable tube.

* * * * *